Figure 2:
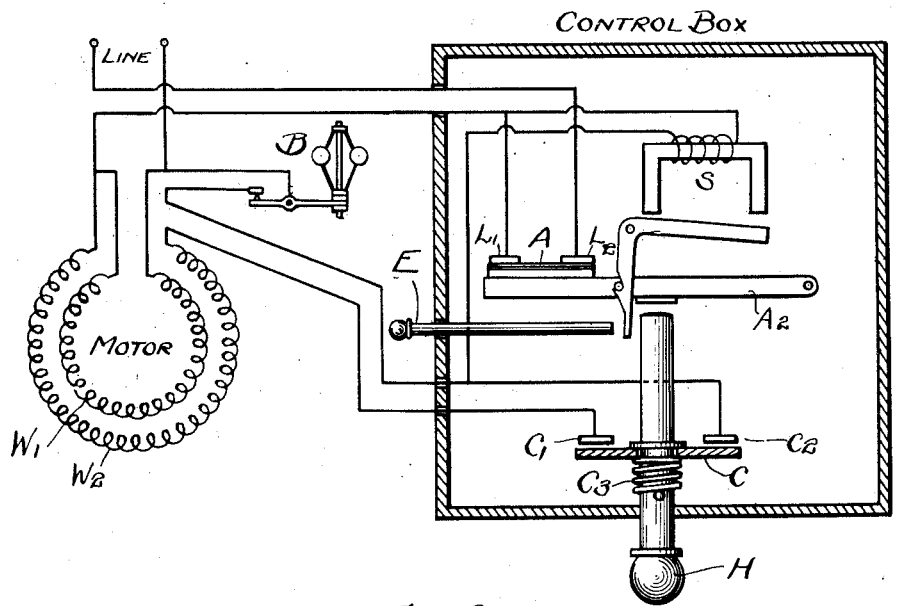
Figure 2A:
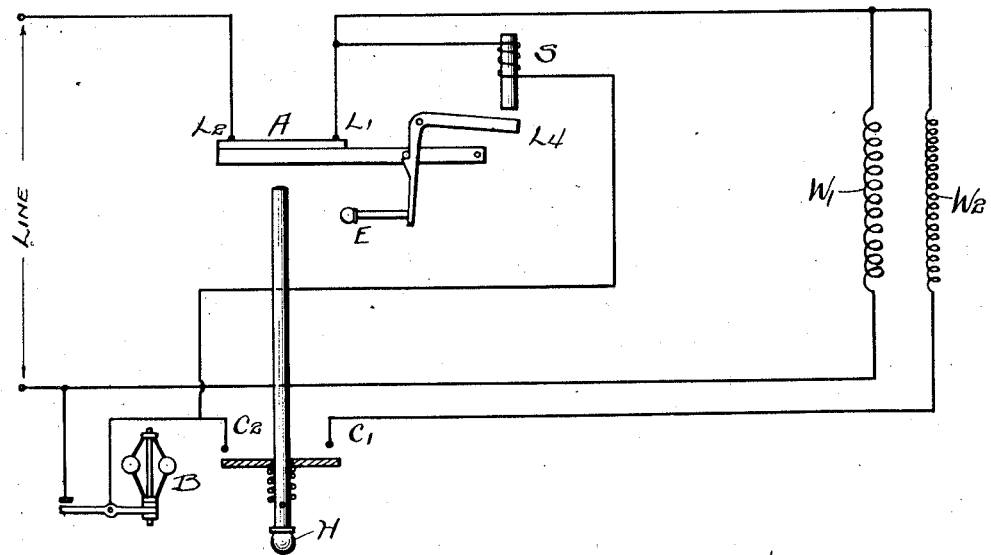

Sept. 21, 1926.  1,600,775
A. S. L. PEASLEE
PROTECTIVE DEVICE FOR ALTERNATING CURRENT MOTORS
Filed Nov. 24, 1922  3 Sheets-Sheet 1
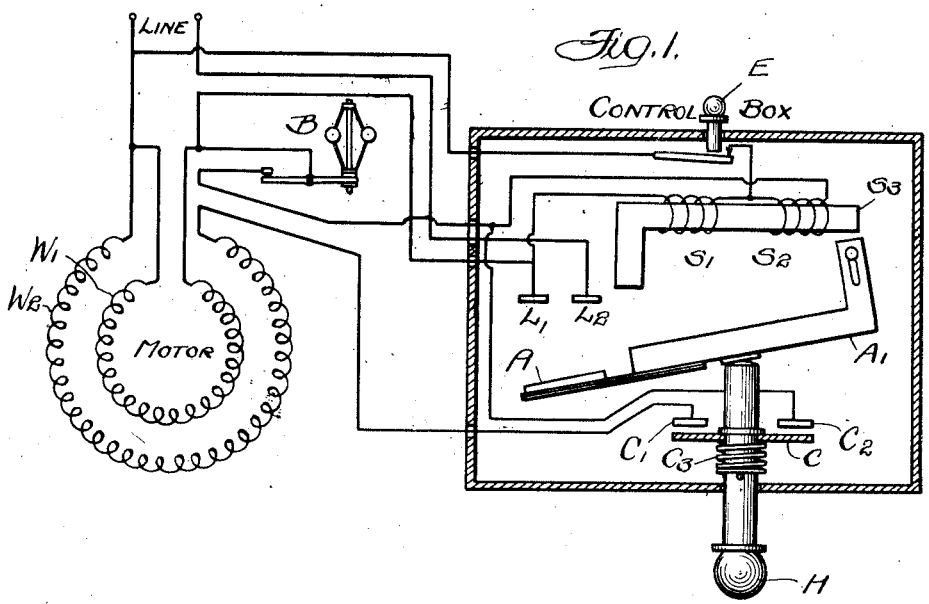
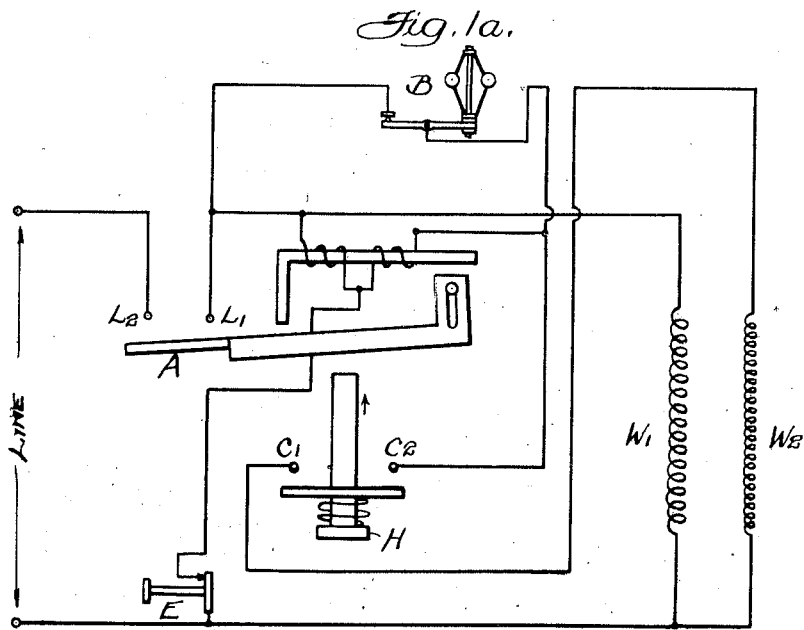
Inventor;
ALEXANDER S. L. PEASLEE Sept. 21, 1926.
A. S. L. PEASLEE
1,600,775
PROTECTIVE DEVICE FOR ALTERNATING CURRENT MOTORS
Filed Nov. 24, 1922   3 Sheets-Sheet 3
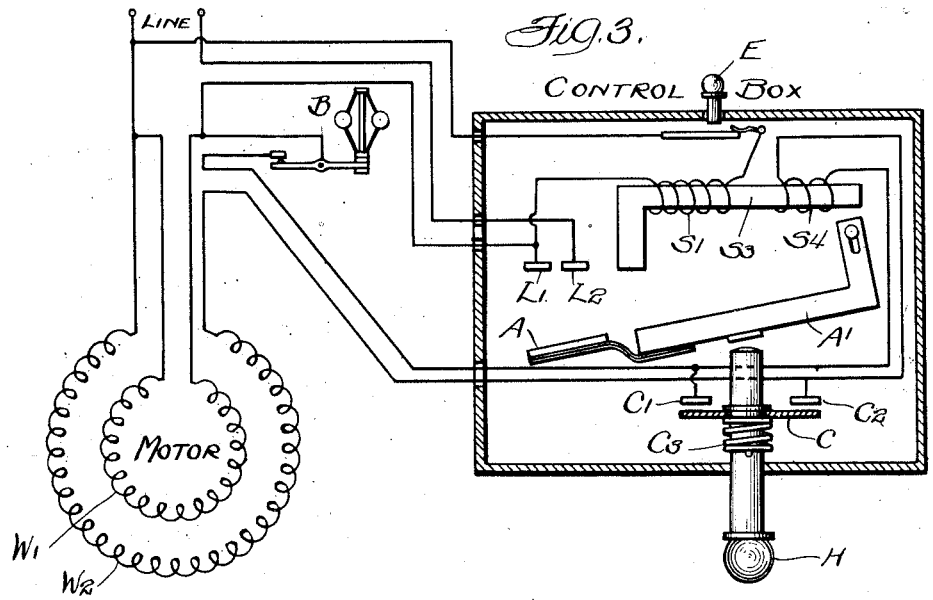
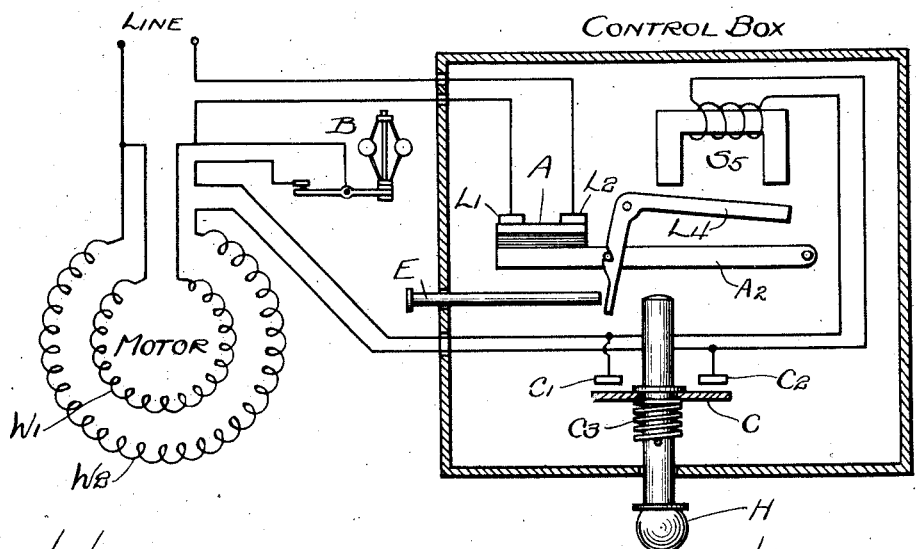
Witnesses:
U. T. Olson
Fred M. Davis
Inventor:
Alexander S. L. Peaslee
By Rummler & Rummler Attys Patented Sept. 21, 1926.

1,600,775

UNITED STATES PATENT OFFICE.

ALEXANDER S. L. PEASLEE, OF OAK PARK, ILLINOIS.

PROTECTIVE DEVICE FOR ALTERNATING-CURRENT MOTORS.

Application filed November 24, 1922. Serial No. 602,986.

This invention relates to alternating current power distribution, and especially to motor controlling means. Furthermore, it finds its chief use and advantage in single phase systems where split phase motors are used.

It may also be applied to any other type of alternating current motor upon equipping the motor with a suitable speed responsive electrical switch, or if a speed controlled switch is already incorporated in the motor, the invention may be applied by the addition of suitable contacts for the operation of this protective device.

A particular application of this device will be found in connection with split phase motors as used to drive household washing machines, ironers, and similar devices. It may also well be used for the protection of electric ventilating and exhaust fan units equipped with the said type of motor.

When used in connection with the said type of motor as part of the equipment of a household washing machine or similar device, this invention may be so constructed as to combine the functions of certain devices as follows, namely: automatic maximum load protective device, automatic no-voltage protective device, manually operated starting switch, and manually operated stopping switch.

The particular merit of this invention lies in the fact that it will permit the motor to develop and deliver its maximum torque but will immediately operate to protect the motor by disconnecting it from the source of current if the maximum torque is exceeded. Furthermore, no adjustment is necessary in case the operating voltage varies from the normal. This device, when employed, does not place any limitations on the normal operation of the motor as compared with the operation without the device, but at the same time provides thorough protection under excessive overloads and upon failure of the current supply.

The advantage of this invention when used in connection with household washing machines and similar devices is due to the following facts, namely; (1st) the washing machine, which is a typical application for the purpose of this case, represents an electrically operated, motor driven device which is manually controlled and is used in many cases on circuits where the supply voltage varies considerably from the normal value. (2nd) Such washing machines are usually equipped with a power driven wringer operated by the electric motor and at times, depending upon the operator, requiring the full power of the motor. It is a commonly known fact that at times satisfactory operation of the machine requires that the motor shall be capable of delivering its full or maximum power for the wringer. (3rd) It is also well known that an electric motor, when operated from a current supply whose voltage is below normal, will require a greater current to develop a given torque than when the normal voltage is available.

Consequently the use of a protective device or circuit breaker of the usual type, actuated by the load current of the motor, gives unsatisfactory results. Under low voltage conditions the excessive load current tends to operate the protective device when the motor is not fully loaded. A means of adjustment becomes necessary, and this is far from satisfactory owing to the lack of skill on the part of the user, and also due to the fact that fluctuations in voltage will necessitate time-to-time changes in adjustment in order to obtain the proper results.

The hereinafter described no-voltage-release feature of this invention is also of value as applied to washing machines or similar apparatus. Serious accidents to the operators of such machines have occurred through entaglement in the wringer or other parts of the mechanism. In case of a failure of the current supply at any point, the use of this device will prevent the restarting of the motor when the current supply is again restored, and the motor can only be started by the voluntary operation of the starting switch by the operator of the machine.

A clear understanding of this invention may be obtained by reference to the accompanying drawings, in which:—

Figures 1, 2, 3 and 4 are circuit diagrams showing several different embodiments of the invention.

Figures 1$^a$ and 2$^a$ are simplified diagrams of the Figure 1 and Figure 2 embodiments, respectively.

In each drawing the motor is of the usual single phase, split phase induction type. The following symbols are common to all of the views. $W^1$ is the main running winding. W² is the starting winding. B is a centrifugal switch, arranged to open the starting winding at or slightly below full load speed of the motor and to close this circuit when at lower speeds or at rest. L¹ and L² are main contacts controlling the current supply to the motor. C¹ and C² are contacts attached to conductors forming a part of the starting winding circuit. E is a stopping button for manually interrupting the current supply. H is a starting button for closing contacts L¹ and L² and establishing current supply to the motor. A is a switch blade arranged to connect the contacts L¹ and L² for running.

In each instance the automatic switch B may to advantage be mounted directly upon the motor, as will be understood, and the rest of the apparatus is preferably housed in a conveniently located control box.

These devices, as will be more fully explained, are all characterized by the following features of operation, (1st) starting by manual inward thrust of member H, which closes the circuits for both windings W¹ and W² of the motor, (2nd) stopping by manual inward thrust of rod E, thereby either directly or indirectly releasing the self opening line switch device A, (3rd) the operation of the blade C of a gravity switch to open the starting circuit as soon as the attendant releases the rod H, as upon attainment by the motor of substantially full speed. As here shown, the switch A is urged to open by gravity and rod H operates either against a spring or against gravity, but either a spring or gravity may be used in each case, as will be understood.

Referring now to further details, and first considering Figure 1, this form of the invention combines the functions of interruption of the current supply whenever the motor slows down, as when the maximum running torque of the motor is exceeded, and also in case of failure of the current supply. It is moreover a manually operated starting and stopping device.

An upward movement of the plunger rod H will close switch A and establish connection between contacts L¹ and L², and also close switch bar C across contacts C¹ and C². This serves to start the motor, but member H has to be held up for a short time. At first the magnet S² remains neutral, as current flows in opposition in the two coils S¹ and S². When the motor has attained sufficient speed to open the contacts of the centrifugal switch B, the coil S² is deenergized. Then a current flows through the magnet coil S¹ only, and this will maintain the bar A in a closed position against the contacts L¹ and L².

Should the speed of the motor fall to such a point as to permit the centrifugal switch B to close, a current will then flow through the magnet coil S² also. As this coil is of equal strength but connected to oppose coil S¹, they will consequently neutralize each other thus permitting armature A¹, constituting the switch arm, to drop and so cause the current to be interrupted at L¹ and L², thus stopping the motor.

Pressure on the button E will interrupt the flow of current through coils S¹ and S², or either of them, and cause a similar opening of the motor circuit.

The purpose of the contacts C¹ and C² is to relieve the contacts L¹ and L² of the necessity of interrupting the heavy starting current of the motor. These contacts C¹ and C² are normally open and are only closed during the time that handle H is held up. Contacts C¹ and C² are not essential but are desirable under certain conditions.

In case of failure of the current supply, as by line trouble, fuse failure or the like, the magnet S¹ will be deenergized and cause the circuit to be opened, preventing restarting of the motor upon restoration of the current supply until the device is normally operated through handle H. This prevents danger of the user becoming injured, as by getting caught in a machine driven by the motor, in case the power should be restored to the line while a starting switch is closed, as may occur in many cases. The switch C is adjusted so as to close before switch A, and the spring C² permits the necessary subsequent play of the starter H as it moves on up to close switch A.

Referring now to Figure 2, this embodiment includes a part which resembles the construction of an ordinary circuit breaker, having a tripping coil S which actuates a latch L⁴ and causes the main switch contacts to open on underspeed, by dropping of bar A. The tripping coil S is connected in such a manner as to operate only when a current flow is established through the contrifugal switch B, which opens upon attainment of normal speed. In this form, the contacts C¹ and C² perform the same function as described in connection with Figure 1. They are not essential, but are desirable under certain conditions. This form of the device does not have the no-voltage release feature. However, should the current supply be restored following an interruption, while the switch A is closed, current will flow through coil S and cause an immediate opening of the contacts L¹ and L². If the contacts C¹ and C² are incorporated no rotation or starting of the motor is possible following merely the restoration of current supply after an interruption, while in case these contacts are not used, only a slight degree of rotation can occur in the brief interval before the current is interrupted.

In the case of both Figure 1 and Figure 2, the design of the magnet coils S, $S^1$ and $S^2$ is determined by the operating voltage, and is not dependent on the characteristics of the motor itself. Here the switch arm $A^2$ need not be magnetic, and it is pivoted at one end, instead of being loosely mounted to fit a magnet core.

Referring to Figure 3, the construction and operation are the same as for Figure 1, excepting that the magnet coil $S^4$ is connected to carry the current which flows through the starting winding $W^2$. This form requires a specific character of coil $S^4$ so designed as to neutralize coil $S^1$ when the starting current flows through it, and coil $S^4$ will therefore have to be made to suit the particular motor with which it is to be used. Contacts $C^1$ and $C^2$ are arranged to short circuit coil $S^4$ while handle H is being operated. This form of the device does not have the no-voltage release feature, but will immediately operate to disconnect the motor from the current supply in case of restoration of current when the motor is standing still, or at any time when the centrifugal switch B is closed and the handle H is released.

Referring to Figure 4, in this form the construction and operation are the same as for Figure 2, excepting that magnet coil $S^5$ is connected to carry the current which flows through the starting winding $W^2$. The remarks regarding contacts $C^1$ and $C^2$ as made in connection with Figure 3, will apply also in this case. This form does not have the no-voltage-release feature, but will operate in the same manner as described in connection with Figure 3, upon restoration of current. The coil $S^5$ must be designed with reference to the particular motor with which it is to be used.

I have shown and described several specific embodiments of apparatus and connections thereof for carrying out my invention herein set forth, but it is to be understood that numerous details of the constructions and connections shown may be altered or omitted without departing from the spirit of this invention as defined by the following claims.

I claim:—

1. A split phase motor, a source of current, motor control means, and connections therefor, said motor having a centrifugal switch adapted to open as the motor comes up to speed, and said control means including a main line switch, a starting coil switch, self restoring manual means operative by one movement to close said line and starting coil switches, releasable means to retain said line switch closed during operation of the motor, and a manually operable member to release said releasable means for stopping the motor, said centrifugal switch being in series with the starting winding and with said starting coil switch.

2. A split phase motor, a source of current, motor control means, and connections therefor, said motor having a centrifugal switch adapted to open as the motor comes up to speed, and said control means including a main line switch, a starting coil switch, self restoring manual means operative by one movement to close said line and starting coil switches, electromagnetic means to retain said line switch closed during operation of the motor, and a manual switch in series with the energizing circuit of said retaining means whereby the main switch may be opened at will, said energizing circuit being divided and including two coils connected in opposition, one direct to the line and the other in series with said centrifugal switch.

3. A split phase electric motor having a main coil and a starting coil, a source of current therefor, and control means connected to said motor and to said source, said control means including a centrifugal switch mechanically connected to and responsive to the speed of said motor, a line switch having electrically controlled automatic means operatively dependent upon said centrifugal switch whereby the condition as to closure of said line switch is determined, a supplemental switch in series with the starting coil, and manual means to close and open said line switch, respectively, said centrifugal switch being in the starting coil circuit.

4. A split phase motor, a source of current, motor control means and connections therefor, said motor having a centrifugal switch adapted to open as the motor comes up to speed and said control means including a main line switch ($L^1$—$L^2$), self-restoring manual means (H) operative by one movement to close said line switch, releasable means ($S^1$—$S^3$) to retain said line switch closed during operation of the motor, and a manually operable member to release said releasable means for stopping the motor, said centrifugal switch being in series with the starting winding.

5. A split phase motor, a source of current, motor control means and connections therefor, said motor having a centrifugal switch adapted to open as the motor comes up to speed, and said control means including a main line switch, self-restoring means adapted for manual operation to close said line switch, means to retain said line switch closed during the operation of the motor, and means responsive to said centrifugal switch to release said line switch for stopping the motor, said speed responsive means being in series with the starting winding of the motor.

6. A split phase electric motor having a main coil and a starting coil, a source of current therefor, and control means connected to said motor and to said source, said control means including a centrifugal switch mechanically connected to and responsive to the speed of said motor, a line switch having electrically controlled automatic means operatively dependent upon said centrifugal switch whereby the condition as to closure of said line switch is determined, and manual means to close and open said line switch, respectively, said centrifugal switch being in the starting coil circuit.

Signed at Chicago this 20th day of November 1922.

ALEXANDER S. L. PEASLEE.